(12) United States Patent
Roudot

(10) Patent No.: US 7,818,345 B2
(45) Date of Patent: Oct. 19, 2010

(54) METHOD FOR CONSTITUTING A DATABASE CONCERNING DATA CONTAINED IN A DOCUMENT

(75) Inventor: Denis Roudot, Strasbourg (FR)

(73) Assignee: Andromaque Prepresse (Societe a Responsabilite Limitee), Strasbourg (FR)

( * ) Notice: Subject to any disclaimer, the term of this patent is extended or adjusted under 35 U.S.C. 154(b) by 1144 days.

(21) Appl. No.: 10/276,596

(22) PCT Filed: May 18, 2001

(86) PCT No.: PCT/FR01/01542

§ 371 (c)(1),
(2), (4) Date: Mar. 25, 2003

(87) PCT Pub. No.: WO01/88749

PCT Pub. Date: Nov. 22, 2001

(65) Prior Publication Data

US 2004/0030711 A1    Feb. 12, 2004

(30) Foreign Application Priority Data

May 18, 2000  (FR) .................................. 00 06343
Jun. 19, 2000  (FR) .................................. 00 07781

(51) Int. Cl.
    *G06F 17/30*    (2006.01)
(52) U.S. Cl. ..................... 707/790; 707/796; 707/812
(58) Field of Classification Search ................ 707/1–2, 707/205–206, 790, 796, 812; 715/200, 227, 715/256, 530
See application file for complete search history.

(56) References Cited

U.S. PATENT DOCUMENTS

| | | | | |
|---|---|---|---|---|
| 5,181,162 A * | 1/1993 | Smith et al. | ................... | 715/530 |
| 5,495,565 A | 2/1996 | Millard et al. | | |
| 5,649,192 A | 7/1997 | Stucky | | |
| 5,890,176 A | 3/1999 | Kish et al. | | |
| 5,963,641 A * | 10/1999 | Crandall et al. | ................. | 380/2 |
| 5,999,664 A * | 12/1999 | Mahoney et al. | ............ | 382/305 |
| 6,154,756 A | 11/2000 | Hearn et al. | | |
| 6,484,149 B1 * | 11/2002 | Jammes et al. | ................. | 705/26 |
| 6,496,198 B1 * | 12/2002 | Wang | .......................... | 345/629 |
| 6,581,068 B1 * | 6/2003 | Bensoussan et al. | ...... | 707/104.1 |

FOREIGN PATENT DOCUMENTS

WO    WO 97 25679 A    7/1997

* cited by examiner

*Primary Examiner*—Don Wong
*Assistant Examiner*—Hanh B Thai
(74) *Attorney, Agent, or Firm*—Egbert Law Offices PLLC

(57) ABSTRACT

A method for forming a storage device containing data, concerning blocks defining the composition of one or several pages of a document and associated with the storage device receiving all of the data and the content of the blocks identified by an identifier. The invention includes: collecting, at the storing device, block after block, and for each block, data concerning each block and associating the identifier and the data, with a site in the storage device; collecting the content of each block corresponding to a text and creating a text file wherein the content of the text block is transferred; and associating the identifier of each text block and each text file with a site in the storage device.

24 Claims, 2 Drawing Sheets

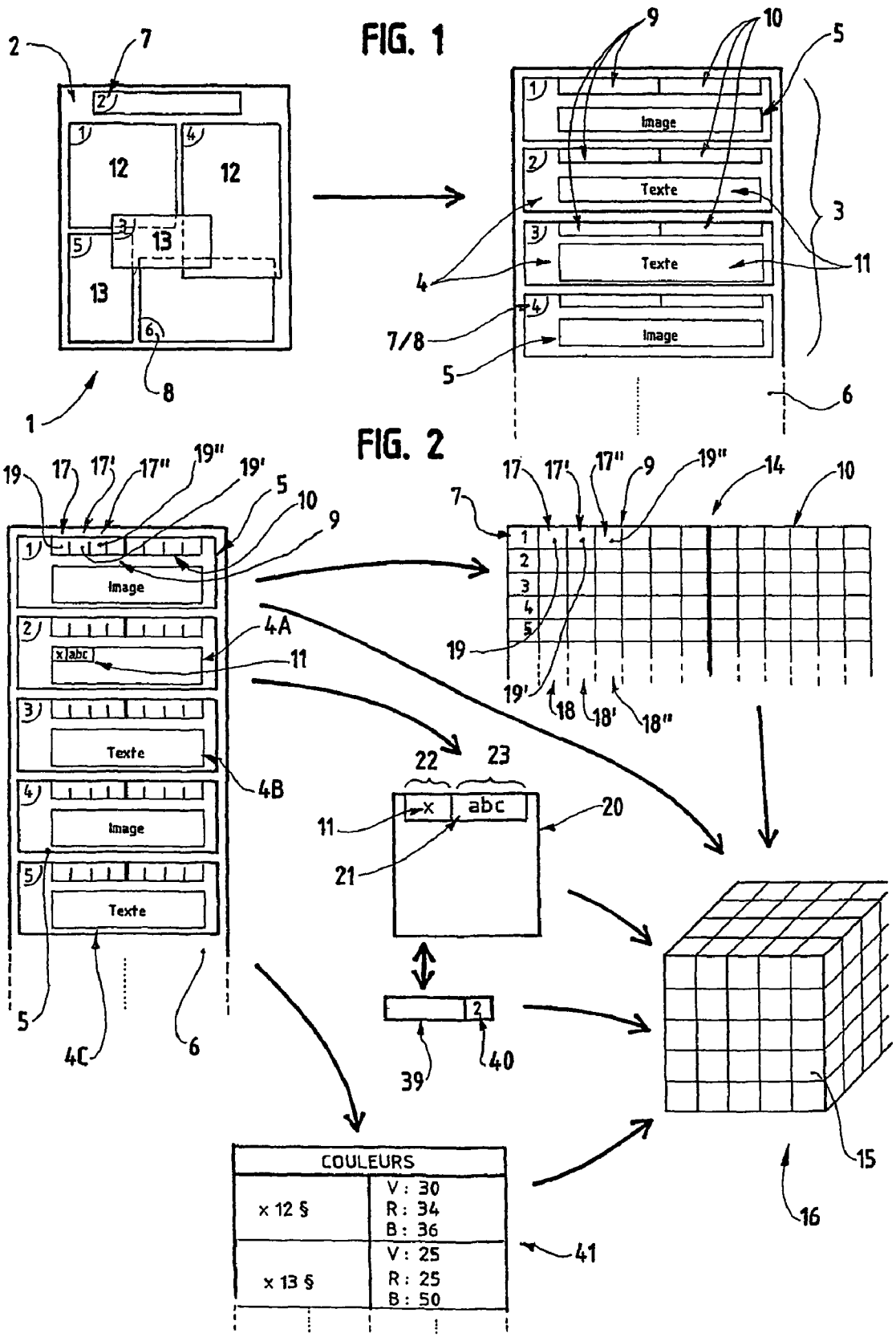

METHOD FOR CONSTITUTING A DATABASE CONCERNING DATA CONTAINED IN A DOCUMENT

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention relates to a method for constituting storage means containing data related to the container and the contents of an aggregate of blocks, each corresponding to a text or to an image, and the adequate arrangement of which allows defining the composition of one or several pages of a document the layout of which is ensured by adequate processing means associated with storage means at the level of which are stored, block after block and for each block, on the one hand, all said data related to the container and the contents of the aggregate of these blocks and, on the other hand, the contents of the latter, each block being associated with an identifier allowing its identification at the level of said storing means.

The present invention is related to the field of the edition of documents comprised of one or several pages, namely information documents or documents of a commercial nature.

BACKGROUND OF THE INVENTION

There are already known documents meeting the above description and adopting, for example, the form of a magazine, a catalogue, a newspaper or a simple printed sheet.

Such a document is usually printed before being made available to the public.

However, before proceeding to such a printing, it is necessary to design such a document, the latter being usually subjected to a number of changes before it is in its final form in which it is released.

In this respect, it should be noted that the design of such a document consists in defining one or several pages comprised of an appropriate arrangement of an aggregate of blocks each corresponding to a text or an image, each of these blocks containing, on the one hand, all the data related to its container and its contents and, on the other hand, its contents.

The arrangement of these blocks is ensured through layout processing means (such as a software program) capable of creating storage means at the level of which are stored, block after block and for each block, on the one hand, all the data related to the container and the contents of the aggregate of these blocks and, on the other hand, the contents of the latter.

From such storage means will indeed be carried out the printing of the document.

It should be noted that these storage means can, between the first version and the final version capable of being printed, undergo a number of changes. The latter consist, for example, in moving, deleting, replacing a block or also in changing the contents of such a block.

Such changes prove indeed very complex to be carried out, since these blocks are likely to adopt a different form and are associated with different types of processing means (software) that often exhibit communication problems between themselves and with the layout software.

In order to cope with these problems, it has been devised to form memory means, such as a database, grouping all the data related to the blocks and present at the level of the storage means. Such a step requires in fact carrying out a marking of each piece of data available at the level of the storage means before transferring the data, included between the tags, into the memory means. This method has a number of drawbacks related, namely, to the fact that the marking should be, on the one hand, particularly accurate and, on the other hand, specific to each type of data. In addition, the data stored in the memory means occupy very much space and are difficult to be changed. Moreover, the data related to the blocks must compulsorily be completed with complementary data, on the one hand, absolutely necessary for delivering the data related to the blocks and, on the other hand, specific to each page-layout software program.

BRIEF SUMMARY OF THE INVENTION

The present invention pretends to provide a solution for the problems experienced with the database-constituting methods known in the state of technique.

To this end, the present invention relates to a method for constituting storage means containing data related to the container and the contents of an aggregate of blocks, each corresponding to a text or to an image, and the adequate arrangement of which allows defining the composition of one or several pages of a document the layout of which is ensured by adequate processing means associated with storage means at the level of which are stored, block after block and for each block, on the one hand, all said data related to the container and the contents of the aggregate of these blocks and, on the other hand, the contents of the latter, each block being associated with an identifier allowing its identification at the level of said storing means, characterized in that:

- at the level of said storing means are collected, block after block and for each block, the data related to the container and the contents of each block;
- the identifier of each block as well as the data related to the container and the contents of each of these blocks are associated with a location in storage means, such as a database;
- at the level of said storage means is collected, block after block and for each block corresponding to a text, the contents of this block and is created, for each of these text blocks, a text file into which the contents of this text block are transferred; and
- the identifier of each text block corresponding to a text as well as each text file corresponding to a text block are associated with a location in the database.

According to another feature, various types of unitary data corresponding to the data related to the container and the contents of each block are collected at the level of said storage means, and the identifier of each block as well as each piece of unitary data corresponding to each type of data related to this block are associated with a location in the memory means.

An additional feature related to the fact that a table is created into which are transferred, block after block, for each block and according to the identifier of the latter, as the case may be, the data related to the container and the contents of each block and/or the unitary data, this per type of unitary data.

According to another feature, the access, as the case may be, either to the data related to the container and the contents of each block or to at least part of the unitary data is limited, at least partially.

An additional feature relates to the fact that the identifier of each block corresponding to a text as well as, as the case may be, to the data related to the container and the contents of this text block and/or to the unitary data related to this text block are associated with the text file in which the contents of this text block appear.

According to another feature, the text file aimed at containing the contents of this text block is generated, as the case may be, during the transfer, into the table, of the data related to the container and the contents of a block corresponding to a text, or during the association of these data with a location in the memory means.

An additional feature consists in that, when the contents of a block corresponding to a text are transferred into a text file, in this text file is formed at least one block-type pattern defined by two parts the first part of which is formed by at least one basic code, while the second part is formed by at least one alphanumeric character, on the one hand, associated with basic codes and, on the other hand, corresponding to the text associated with said text block and appearing at the level of the page of the document.

In fact, the alphanumeric character or characters of the second part of the block-type pattern, even the basic code or codes of the first part of the block-type pattern, are associated with a location in said memory means.

According to another feature, when the first part of a block-type pattern is formed by a series of basic codes, an additional basic code corresponding to this series of basic codes is defined and this series of basic codes and/or said additional basic code are associated with a location in the database.

From the text file is created a complementary text file in which the series of basic codes corresponding to the first part of the block-type pattern or patterns is replaced by the corresponding additional basic code and the thus created complementary text file is associated with a location in the memory means.

According to an additional feature, the basic code or codes forming the first part of the block-type pattern or patterns of these text files are interpreted for each text file, and interpreted codes as well as the alphanumeric characters forming the second part of the blocktype pattern or patterns of these text files are associated with a location in the memory means.

When the first part of a block-type pattern is formed of a series of basic codes, these basic codes are interpreted, a series of interpreted codes is formed and an additional interpreted code corresponding to this series of interpreted codes is defined and/or the series of interpreted codes and/or said additional interpreted code are associated with a location in the database.

From the text file is created an additional text file in which the series of basic codes corresponding to the first part of the block-type pattern or patterns is replaced, as the case may be, by the corresponding series of interpreted codes or by the corresponding additional interpreted code and the thus created additional text file is associated with a location in the memory means.

According to another feature of the present invention, the contents of a block corresponding to a text are transferred into a text file, at least one specific basic code defined by a series of basic codes and corresponding, for example, to a specific presentation style of at least part of the text corresponding to said block is integrated into this text file, said specific basic code being associated with the first part of at least one block-type pattern said text file includes.

Another feature relates to the fact that said specific basic code and/or the series of basic codes corresponding to this specific basic code are associated with a location in the memory means.

The basic codes forming the series of basic codes defining the specific basic code are interpreted, a specific interpreted code formed by the series of interpreted codes is defined and this series of interpreted codes and/or said specific interpreted code are associated with a location in the memory means.

From the text file is created a further text file in which the specific basic code is replaced by the corresponding specific interpreted code and this thus created further text file is associated with a location in the memory means.

An additional feature relates to the fact that the access, as the case may be, to at least part of said text files and/or to the alphanumeric character(s) and/or to at least part of the codes, namely those associated with a location in the database, is limited, at least partially.

According to an additional feature, when creating a text file corresponding to a text block, a tag specific to this text file and associated with the latter is created and this tag is associated with a location in the memory means.

When creating this tag, the latter is associated with a piece of data related to the page in which the text block corresponding to the text file associated with said tag appears, and this piece of data is associated with a location in the memory means.

For at least one page of the document, and per page, a marked file is created into which are transferred all the tags corresponding to the text blocks of this page and this marked file is associated with a location in the memory means.

In fact, with this marked file is associated a secondary marked file at the level of which appear, capable of being at least partially changed, the contents of the text blocks corresponding to a page and this secondary marked file is associated with a location in the memory means.

According to another feature, the access, as the case may be, to said tags and/or to the marked files and/or to the contents of the marked secondary files is limited, at least partially.

According to an additional feature, the identifier of each block corresponding to an image as well as the data related to the container and the contents of this block are associated with the contents of said image block.

The identifier of each block corresponding to an image as well as the contents of this block are associated with a location in the memory means.

According to another feature, data related to the various colors appearing in the blocks are detected at the level of the storage means, a composition of primary colors is associated with each piece of data corresponding to a given color, and this composition and/or the piece of data related to this given color are associated with a location in the memory means.

A table is created into which the composition of the primary colors corresponding to this piece of data is transferred according to each piece of data related to a given color.

An additional feature consists in that the access, as the case may be, to the contents of said image block and/or to the composition of primary colors and/or to the piece of data corresponding to a given color detected at the level of the storage means is limited, at least partially.

This method is implemented, at least partially, through at least one processing means such as a software program.

The advantages of the present invention reside in that the method allows constituting a memory means, such as a database, containing all the data related to the container and the contents of each of the blocks involved in the composition of a document. This method also allows associating the contents of these blocks with said memory means.

In fact, this memory means can advantageously be designed in such a way that it is possible to use the data it contains for, on the one hand, intervening on the blocks of a document and, on the other hand, ensuring the management of the latter and, still on the other hand, reconstituting such a document or constituting a new document.

According to another advantage, it is possible to define files which all the blocks, namely the text blocks, corresponding to one and the same page are associated with. The contents of these files are likely to be changed, the changes made resulting into changes that appear at the level of the blocks corresponding to this page.

Another advantage resides in that it is possible to limit, at least partially, the access to the contents of the blocks, to the data they contain, even to the blocks themselves, this with a view to avoid an operator from proceeding, namely inadvertently, to an unwanted change.

Thus, through such an embodiment, only duly authorized persons are capable of acceding to and/or of changing the contents and/or the data related to the container and the contents of said blocks.

This method advantageously allows coded data to be collected, at the level of a storage means generated by layout processing means (software), in a specific way by said processing means and to make these data, on the one hand, available at the level of a memory means, such as a database, and, on the other hand, capable of being changed.

The invention is set forth in more detail in the following description relating to embodiments given by way of examples and shown in the figures of the attached drawings.

BRIEF DESCRIPTION OF THE SEVERAL VIEWS OF THE DRAWINGS

FIG. 1 is a schematic view, on the one hand, of a document resulting from the appropriate arrangement of blocks and, on the other hand, of storage means corresponding to this document and from which the latter is generated.

FIG. 2 corresponds to a schematic and synoptic view of the application of the method according to the invention to storage means defined by an aggregate of blocks.

DETAILED DESCRIPTION OF THE INVENTION

Figure 3:
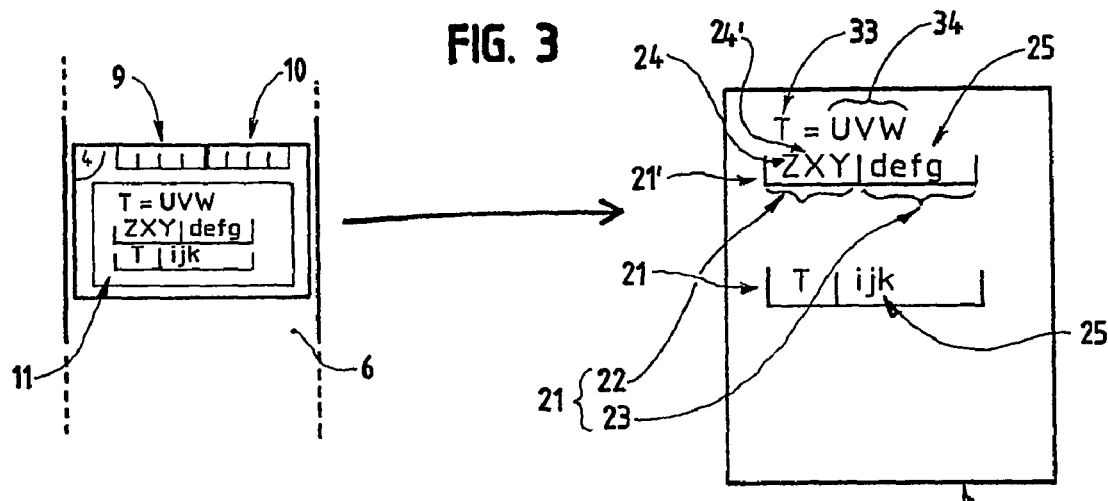
FIG. 3 corresponds to a schematic and detailed view of a text block from which a text file is created.

The present invention relates to the field of the edition of documents comprised of one or several pages, namely a tract, a newspaper, a magazine, a catalogue or the like.

It should be noted that in the further description, reference will be made mainly to a document 1 comprised of only one page 2, whereby one should know that the application of the method according to the invention is in no way limited to a document of that kind, the latter may of course include several pages, eventually grouped into one or several booklets.

In FIG. 1 is shown a document 1 comprised of one single page 2 the contents of which are defined by an adequate arrangement of an aggregate 3 of blocks 4, 5. The latter are namely formed of blocks 4 corresponding to a text and of blocks 5 corresponding to an image.

In this respect, it should be noted that the arrangement of these blocks 4, 5 is carried out through layout processing means capable, in addition, of ensuring the creation of storage means 6 at the level of which the aggregate 3 of blocks 4, 5 of the document 1 is grouped, whereby the latter can be comprised of one or several pages.

Such storage means 6 are, for example, formed of a data-processing file capable of being transmitted to a printer and containing all the data likely to allow the printing out of the document 1.

In fact, these storage means 6 contain the aggregate 3 of the blocks 4, 5 arranged, as can be seen in FIGS. 1 and 2, one after another. In this respect, it should be noted that the arrangement of these blocks 4, 5 at the level of said storage means 6 can be in the order of occurrence of these blocks 4, 5 at the level of the document 1, whereby one should know that such an arrangement, on the one hand, is in no way compulsory and, on the other hand, can be at random.

It should be noted that each block 4, 5 is associated with an identifier 7 allowing identifying said block 4, 5, namely at the level of the storage means 6. Such an identifier 7 is comprised, for example, of a number 8 corresponding, preferably, to the order of occurrence of said block 4, 5 in the document 1 or in the storage means 6.

Each block 4, 5 contains data 9 related to the container of said block 4, 5, such data 9 corresponding, for example, to the position of the block, its orientation, its shape, its depth at the level of the page 2, the number of the page or of the booklet of pages on which said block appears at the level of the document 1, the type of contents of the block (image, text) . . . .

Each block 4, 5 also contains data 10 related to the contents 11 of said block 4, 5, such data 10 corresponding, for example, to the presentation of the contents 11 of said block, the arrangement of its contents 11, its positioning.

In addition, each block 4, 5 contains its contents 11, i.e. the image 12 or the text 13 aimed at appearing at the level of the document 1.

In fact, the aggregate of these data 9, 10 as well as the identifier 7 and the contents 11 of these blocks 4, 5 are stored at the level of said storage means 6, this block after block and for each of these blocks 4, 5.

According to the invention, the data 9, 10 related to the container and the contents 11 of each of the blocks 4, 5 are collected at the level of the storage means 6, block after block and for each block 4, 5.

Still according to the invention, the identifier 7 of each block 4, 5 as well as the data 9, 10 related to the container and the contents 11 of each of these blocks 4, 5 are associated with a location 15 of memory means 16, such as a database.

According to another feature, a table 14 is created, into which the data 9, 10 related to the container and the contents 11 of each of these blocks 4, 5 are transferred, block after block and for each block 4, 5 present at the level of the storage means 6. It should be noted that these data 9, 10 are transferred into the table 14 according to the identifier 7 of the block 4, 5 which said data 9, 10 correspond to.

In fact, the data 9, 10 contained in the table 14 can also be associated with a location 15 of these memory means 16. In this respect and according to a particular embodiment, such an association consists in copying said table 14 into these memory means 16.

It should be noted that the data 9, 10 related to the container and the contents 11 of the blocks 4, 5 are comprised of various types 17, 17', 17" of data related to the container and the contents 11 of each block 4, 5 (position of the block, orientation, shape, depth, type; layout, arrangement, positioning, . . . ). It should be noted that to each type 17, 17', 17" of data corresponds a piece of unitary data 19, 19', 19" available at the level of said storage means 6, for each of the blocks 4, 5 and at the level of the latter.

Thus, when the data 9, 10 related to the container and the contents 11 of the blocks 4, 5 are collected at the level of said storage means 6, in fact the unitary data 19, 19', 19" corresponding to each type 17, 17', 17" of data are collected.

Therefore, when the data 9, 10 related to the container and the contents 11 of these blocks 4, 5 are associated with a location 15 in the memory means 16, in fact said unitary data 19 corresponding to each type 17 of data are associated with a location 15 in the memory means 16.

Likewise, when said data 9, 10 are transferred into the table 14, the unitary data 19, 19', 19" corresponding to each type 17, 17', 17" of data are transferred. These unitary data 19 are in fact transferred into the table 14 according to their type 17 for each block 4, 5 and according to the identifier 7 of the latter.

Such an embodiment requires, when creating said table 14, providing for the latter as many columns 18, 18', 18" as there are types 17, 17', 17" of data, so as to be able to classify in this table 14, on the one hand, all the unitary data 19, 19', 19" corresponding to all the types 17, 17', 17" of data and, on the other hand, all the unitary data 19 corresponding to one and the same type 17 of data in one and the same column 18, this for each block 4, 5 and according to the identifier 7 of the latter.

In fact, it should be noted that the identifier 7 of each block 4, 5 as well as each piece of unitary data 19 corresponding to each type 17 of information related to this block 4, 5, namely present in the table 14, can also be associated with a location 15 in the memory means 16.

Here too, such an association can consist in that the table 14 is copied into said memory means 16.

It should be noted that the operations consisting in creating the table 14, in collecting the data 9, 10, 19, in transferring the latter into said table 14 and/or in associating the latter and/or the identifier 7 with a location 15 in the memory means 16 can be performed through at least one processing means such as a software program.

According to another feature of this invention, the access to the data 9, 10, 19, as the case may be, associated with a location 15 in the memory means 16 and/or contained in the table 14 is limited, at least partially.

Such a limitation applies in fact, as the case may be, either to the data 9, 10 related to the container and the contents or to at least part of the unitary data 19.

It should be noted that this limitation can be made according to the nature (container and/or contents) of the data 9, 10 and/or to the type 17 of these data 19 and/or to the operator having access to the storage means 16.

Through this limitation of access, the display, accessibility and/or change of at least part of said data 9, 10, 19 are impeded or authorized for a given operator, but not for another one. Such a limitation advantageously allows impeding, for example, the unwanted change of data by an operator.

According to another feature of the present invention, the contents 11 of the text block 4A, 4B, 4C is collected at the level of said storage means 5, block after block and for each block 4A, 4B, 4C.

For each text block 4A, 4B, 4C is created a text file into which the contents 11 of this text block 4A, 4B, 4C are transferred.

Another feature consists in that the identifier 7 of each block 4 corresponding to a text as well as the data 9, 10 related to the container and the contents 11 of this text block 4, are associated with the text file 20 in which the contents 11 of this text block 4 appear.

The unitary data 19 related to this text block 4 as well as the identifier 7 of the latter can also be associated with the text file 20 in which the contents 11 of this text block 4 appear.

In this respect, it should be noted that the identifier 7 and/or the data 9, 10, 19, which the text file 20 is associated with, correspond, according to the case, to those transferred into the table 14, to those appearing at the level of the storage means 6 and/or to those associated with a location 15 in the memory means 16.

In fact, it should be noted that the text file 20, aimed at containing the contents 11 of a text block 4, is generated, as the case may be, either during the transfer into the table 14 of the data 9, 10, 19 related to the container and the contents 11 of this text block 4 or during the association of these data 9, 10, 19 to a location 15 in the memory means 16.

According to another feature of the present invention, when transferring the contents 11 of a text block 4 into this text file 20, at least one block-type pattern 21, 21' is formed in this text file 20.

Such a block-type pattern 21 is defined by two parts 22, 23, a first part 22 second part 23.

This first part 22 is comprised of at least one basic code 24, 24', while the second part 23 is comprised of at least one alphanumeric character 25.

This or these alphanumeric characters 25 are, on the one hand, associated with the basic code(s) 24. On the other hand, this or these alphanumeric characters 25 correspond to the text associated with said text block 4 and appearing at the level of the page 2 of the document 1.

Another feature consists in that the alphanumeric character or characters 25 corresponding to the second part 23 of said block-type pattern 21 are associated with a location 15 in the memory means 16.

Likewise, it can be contemplated to associate the basic code or codes 24 corresponding to the first part 22 of the block-type pattern 21 with a location 15 in the memory means 16.

In this respect, it should be noted that it is possible to define a table of correspondence between the basic code or codes 24 of the first part 22 of the block-type pattern 21 and the alphanumeric character or characters 25 of the second part 23 of this block-type pattern 21.

Such a table can namely be associated with a location 15 in said memory means 16, even copied into the latter.

In fact, when the first part 22 of a block-type pattern 21 is comprised of a series 26 of basic codes 24, a solution consists in defining an additional basic code 27 corresponding to this series 26 of basic codes 24.

This series 26 of basic codes 24 and/or said additional basic code 27 are then associated with a location 15 in said memory means 16.

Here too, it is possible to define a table of correspondence between the series 26 of basic codes 24 and the corresponding additional basic code 27. Especially this table can be associated with a location 15 in said database 16, even copied into the latter.

In this respect, it should be noted that, when the text file 20 includes several block-type patterns 21 the first part 22 of which is comprised of a series of basic codes, it is possible to define, for each of these series of basic codes, an own additional basic code for each series.

Figure 4:
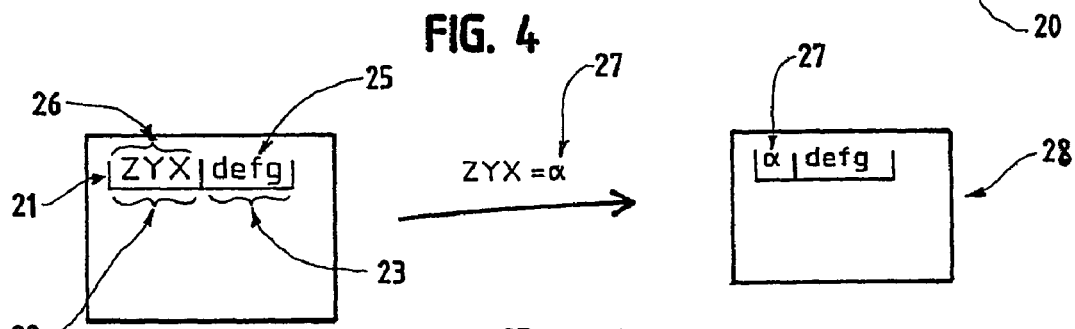
FIGS. 4, 5 and 6 correspond to schematic and detailed views of a text file from which a complementary text file, an additional text file and a further text file are created.

It should be noted that it is possible to define, from said text file 20, a complementary text file 28, as can be seen in FIG. 4, in which the series 26 of basic codes 24 corresponding to the first part 22 of the block-type pattern or patterns 21 is or are replaced by the corresponding additional basic code or codes 27.

The complementary text file 28 thus created is associated with a location 15 in the memory means 16, namely through storing it at the level of the latter.

It should be noted that the basic code or codes 24 appearing, on the one hand, in the contents 11 of a text block 4 at the level of said storage means 6 and, on the other hand, in the text file 20 are usually specific to the layout processing means (software), so that they are not automatically capable of being, on the one hand, understood and, on the other hand, used by another processing means (such as a software program), namely a text-processing program.

Therefore, in most cases it is absolutely necessary to interpret this or these basic codes 24 in order to convert them into a form that can be used by another processing means such as a software program.

This results into the basic codes 24 forming the first part 22 of the block-type pattern or patterns 21 of these text files 20 being interpreted for each text file 20, in order to define one or several interpreted basic codes 29. The interpreted basic code or codes 29 as well as the alphanumeric character or characters 25 forming the second part 23 of said block-type pattern or patterns 21 are then associated with a location 15 in the memory means 16.

Such an association can also be formed through a table associated with such a location 15 or copied into the memory means 16, this table establishing a correspondence between the interpreted code or codes 29 and the alphanumeric character or characters 25. It is also possible to define a table of correspondence between the basic code or codes 24 and, as the case may be, the interpreted code or codes 29 or the alphanumeric character or characters 25, this table then being associated with a location 15 in the memory means 16.

In this respect, it should be noted that, when the first part 22 of a block-type pattern 21 is comprised of a series 26 of basic codes 24, the latter 24 are interpreted and a series 30 of interpreted codes 29 is formed.

An additional interpreted code 31 corresponding to this series 30 of interpreted codes 29 is then defined.

This series 30 of interpreted codes 29 and/or said additional interpreted code 31 are associated with a location 15 in the memory means 16. It is also possible to associate, on the one hand, the series 26 of basic codes 24 and/or the additional basic code 27 and, on the other hand, the series 30 of interpreted codes 29 and/or said additional interpreted code 31 with a location 15 in the memory means 16.

Here too, it is possible to define a table of correspondence between, on the one hand, the series 26 of basic codes 24 and/or the additional basic code 27 and, on the other hand, the series 30 of interpreted codes 29 and/or said additional interpreted code 31. Especially that table can be associated with a location 15 in said memory means 16, even copied into the latter.

Figure 5:
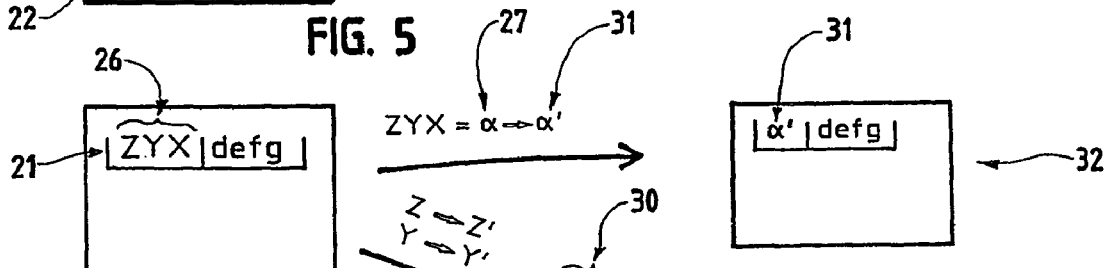

Another feature, shown in FIG. 5, consists in that from the text file 20 is created an additional text file 32 in which the series 26 of basic codes 24 corresponding to the first part 22 of the block-type pattern or patterns 21 is replaced, as the case may be, by the series 30 of interpreted codes 29 or the additional interpreted code 31 that corresponds to this series 30.

This additional text file 32 is then associated with a location 15 in said memory means 16, namely through storing in the latter 16 said additional text file 32.

According to another feature of the present invention, the contents 11 of a text block 4 are transferred into a text file 20, into this text file 20 is integrated at least one specific basic code 33 defined by a series 34 of basic codes 24. This specific basic code 33 corresponds, for example, to a specific style of presentation of at least part of the text corresponding to said text block 4. This specific basic code 33 is usually defined at the top of the text file 20 and is associated with the first part 22 of at least one block-type pattern 21 this text file 20 includes.

This specific basic code 33 and/or the series 34 of basic codes 24 corresponding to the latter 33 are associated with a location 15 in the memory means 16.

Another feature consists in that the basic codes 24 forming the series 34 of basic codes 24 defining the specific basic code 33 are interpreted. A specific interpreted code 35 formed by a series 36 of codes 37 corresponding to the interpreted basic codes 24 is defined.

This series 36 of interpreted codes 37 and/or said specific interpreted code 35 are associated with a location 15 in the memory means 16.

In this respect, it is possible to define a table of correspondence between, on the one hand, the specific basic code 33 and/or the series 34 of basic codes 24 corresponding to the latter 33 and, on the other hand, the series 36 of interpreted codes 37 and/or said specific interpreted code 35. Here too, this table can be stored in the memory means 16.

Figure 6:
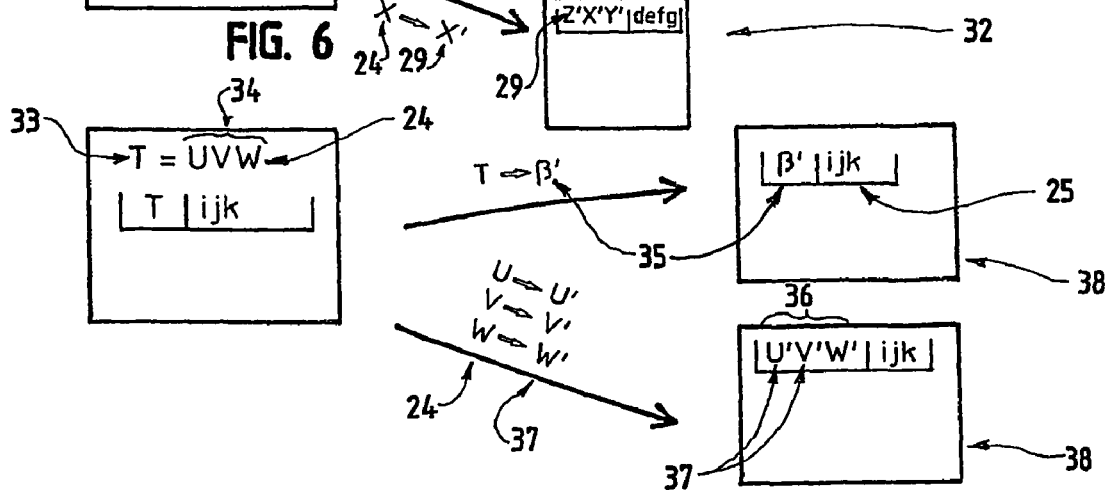

As can be seen in FIG. 6, from the text file 20 can be defined a further text file 38 in which the specific basic code 33 is replaced by the interpreted specific code 35. This further text file 38 is associated with a location 15 in the memory means 16, namely by ensuring its storing in the latter 16.

As described above, it is possible to associate the text file 20, the complementary text file 28, the additional text file 32 as well as the further text file 38 with a location 15 in the database 16, whereby such an association can be performed through copying this or these files into said memory means 16.

It is obvious that a basic file 20 may include one or several block-type patterns 21 the first part 22 of which is comprised of at least one basic code 24 and/or one series 26 of basic codes 24, namely defined by an additional basic code 27 or a specific basic code 33, as can be seen in FIG. 3.

A preferred embodiment then consists in creating a finalized text file for which the first part 22 of the block-type pattern or patterns 21 is defined, as the case may be, by an interpreted code 29, an additional interpreted code 31 or a specific interpreted code 35. This finalized text file includes, associated with said interpreted codes (29, 31, 35), the alphanumeric character or characters 25.

In particular this finalized text file is associated with a location 15 in the memory means 16, namely through storing it into the latter.

It is also at the level of this finalized text file and/or of these files (20, 29, 32, 38), preferably of the complementary 32 or further text file 38, that an operator is capable of intervening to make changes to the contents 11 of the text corresponding to a text block 4.

In this respect, it should be noted that, when this finalized file and/or the other text files (20, 29, 32, 38) are associated with a location 15 in said memory means 16, the access to at least part of these text files (20, 29, 32, 38) and/or to the contents 11 of the text of the latter can be limited, at least partially. Such a limitation can occur on at least part of said contents 11 of the context and/or according to the nature of the change and/or the operator entrusted with the latter.

In this respect, it should be noted that it is possible to limit, at least partially, the access to the alphanumeric character or characters 25 and/or to at least part of the various codes (24, 26, 27, 29, 30, 31, 33, 34, 35, 36, 37), namely associated with a location 15 in said memory means 16 or appearing in a table.

Therefore, according to a particular embodiment, the finalized text file and/or the other files (20, 29, 32, 38) can be so defined that said basic (24, 26, 27, 33, 34) or interpreted codes (29, 30, 31, 35, 36, 37) are not accessible to an operator and that the latter can only accede and/or make changes to the alphanumeric character or characters 25.

It should be noted that the basic code or codes (24, 26, 27, 33, 34) and, hence, the interpreted codes (29, 30, 31, 35, 36, 37) can be characteristic for determined data appearing at the level of the contents 11 of a text block 4, such data corresponding, for example, to a particular style of presentation of the text, to a slogan, to a reference (namely a price, a catalogue item . . . ) or the like.

In this respect, it should be noted that sometimes it is desirable to keep these characteristic data without making changes to it, which can be contemplated through the above-mentioned limitation of access.

It can however also be contemplated to list such characteristic data. To this end, the method according to the invention also consists in detecting such data at the level of the contents 11 of at least one of the text blocks 4, and in associating them with a location 15 in said memory means 16.

In this respect, such detection can be carried out manually and/or automatically.

Here too, the access to such characteristic data can be limited, at least partially.

It is also possible to associate, namely through memory means 16 and/or a table, on the one hand, at least part of the interpreted codes (29, 30, 31, 35, 36, 37) and/or, on the other hand, at least part of the basic codes (24, 26, 27, 33, 34) and/or, still on the other hand, the above-mentioned characteristic data related to an indication about the style, to a reference or the like.

Such tables can also be associated with a location 15 in said memory means 16, even be stored in the latter.

Such an association allows defining a filter capable, when the contents 11 of various text blocks 4 are successively collected at the level of said storage means 6, of automatically ensuring the correspondence between the basic code or codes (24, 26, 27, 33, 34) collected at the level of the storage means 6, the interpreted codes (29, 30, 31, 35, 36, 37) and/or the associated characteristic data.

This allows, for example, marking all the basic codes (24, 26, 27, 33, 34) corresponding to determined data (namely characteristic data for the reference of a catalogue item, a price or the like), in order to incorporate said data later on at the level of a specific location 15 in the memory means 16 and/or to extract these data, for example with a view to making a listing.

This also allows, after changing the contents 11 of the text of a text block 4 at the level of a text file (32, 38 or finalized file), to automatically ensure the correspondence between the interpreted code or codes (29, 30, 31, 35, 36, 37) and the basic code or codes (24, 26, 27, 33, 34), in order to be able to generate, from the modified text file, a new storage means 6 and/or a new document 1 containing codes likely to be understood and used by the layout processing means (software) of said storage means 6.

Obviously, when these changes are made at the level of a text file (20, 28) containing basic codes (24, 26, 27, 33, 34), such a correspondence is not compulsory and it is possible to generate, on the basis of the texts files with the modified contents 11, a new storage means 6 and/or a new document 1 containing codes likely to be understood and used by the layout processing means (software) of said storage means 6.

In this respect, it should be noted that, when the data 9, 10 related to the container and the contents 11 and/or to the unitary data 19 are capable of being modified, it is also possible to generate a new storage means 6 and/or a new document 1.

It should be noted that the generation of such a new storage means 6 and/or of such a new document 1 can also be performed through at least one processing means such as a software program.

According to another feature of the present invention, when creating a text file 20 corresponding to a text block, a tag 39 is created specific to this text file 20, associated with the latter and defining a path of access to said text file 20, even, through appropriate associating means, to the files (32, 38 or finalized file) corresponding to said text file 20.

This tag 39 is associated with a location 15 in the memory means 16, namely through storing it in the latter.

In addition, when creating this tag 39, the latter is associated with a piece of data 40 related to the page 2 of the document 1 in which the text block 4 corresponding to the text file 20 associated with said tag 39 appears, as can be seen in FIG. 2.

This piece of data 40 is associated with a location 15 in the memory means 16.

According to an additional feature, a marked file into which are transferred all the tags 39 corresponding to the text blocks 4 of this page 2 is created for at least one page 2 of the document 1, and per page.

Such an embodiment allows, in fact, gathering all the tags 39 allowing acceding to the contents 11 of all the text blocks 4 of one and the same page 2 of a document 1, namely with a view to intervening on this page 2.

This marked file is associated with a location 15 in the memory means 16, namely through storing it in the latter.

In this respect, it should be noted that it is possible to limit, at least partially, the access to at least one of the tags 39 and/or to such a marked file, this with a view to avoiding an unauthorized operator from displaying and/or changing such a tag 39 or such a marked file.

Such a limitation allows, for example, avoiding an alteration, namely an involuntary or even accidental alteration, of these tags 39 by an operator entrusted with making changes to the contents 11 of the text block or blocks 4 of the page 2 corresponding to this marked file.

With this marked file can also be associated a secondary marked file at the level of which the contents 11 of the text blocks 4 corresponding to the page 2 appear, said contents 11 being capable of being changed, at least partially.

Here too, it is possible to associate these secondary marked files with a location 15 in the memory means 16, namely through storing them at the level of the latter.

It should be noted that, here too, it is possible to limit, at least partially, the access, as the case may be, to such a secondary marked file or to the contents 11 of the texts blocks 4 of such a secondary marked file, namely by limiting, at least partially, the access to the alphanumeric character or characters 25 and/or to at least part of the various codes, as mentioned above.

Once the changes have been made at the level of the marked file or of the secondary marked file, it is possible to generate a new marked file or a new secondary marked file on the basis of which a new page 2 at the level of which the changes made appear can be reconstituted.

Making use of such marked files advantageously allows, namely after a change, making a tract or the like consisting, for example, of a part of a catalogue defined by the document 1.

As regards the blocks 5 corresponding to an image, it should be noted that the identifier 7 of each of these blocks 5 as well as the data 9, 10 related to the container and the contents of this block 5 are associated with the contents of said image block 5 appearing, namely, at the level of the storage means 6.

In addition, it is possible to associate the identifier 7 of each block 5 corresponding to an image as well as the contents of this image block 5 with a location 15 in the memory means 16.

Such an association can also be performed through storing in said memory means 16.

Here too, it is possible to limit, at least partially, the access to the contents of such an image block 5.

It should be noted that the blocks 4, 5 appearing at the level of the storage means 6 also contain data regarding the colors appearing at the level of the images and/of the texts of these blocks 4, 5.

In this respect, it should be noted that, like for the basic codes 24, these data generally adopt a form specific to the layout processing means (software), so that they may not be understandable for other processing means (software).

Therefore, a solution consists in analyzing these data and in decomposing colors detected at the level of said storage means 6 into a composition of primary colors (green, red, blue).

Such a composition of primary colors and/or the data related to this color and detected at the level of the storage means 6 are then associated with a location 15 in the memory means 16.

Here too, it is possible to limit, at least partially, the access to this composition of colors and/or to the data related to this color and detected at the level of the storage means 6.

According to a preferred embodiment that can be seen in FIG. 2, a table 41 is created into which is transferred, according to each piece of data related to a given color detected at the level of the storage means 6, the composition of primary colors corresponding to this piece of data.

In particular this table 41 will be associated with the location in the memory means 16, namely through storing it in the latter.

It should be noted that at least some operations performed through the method described above, and consisting namely in:

- collecting data 9, 10, 19 related to the container and the contents 11 of the blocks 4, 5 and/or data related to the colors appearing in these blocks 4, 5;
- collecting the contents 11 of these blocks 4, 5;
- creating tables (14, 41);
- generating text files (20, 28, 32, 38), marked files and/or secondary marked files;
- transferring data 9, 10, 19 of a block 4, 5 into a table;
- transferring the contents 11 of a block 4 into a text file;
- defining codes (24, 27, 33), series of codes (26, 34) and/or interpreting them in order to define interpreted codes (29, 35, 37) or series (30, 36) of interpreted codes;
- defining tags 39;
- associating at least some of the above-mentioned characteristics with each other and/or with a location 15 in a memory means 16, such as a database; and
- limiting, at least partially, the access to the data, namely those associated with a location 15 in the memory means 16;

can be performed, at least partially, through at least one processing means such as a software program. This or these processing means are capable of implementing, at least partially, said method described above.

The present invention allows constituting memory means 16, such as a database, grouping all the data related to the container and the contents of the blocks involved in the composition of the pages of a document.

This invention also allows converting these data into a form understandable and usable by another processing means such as a software program, namely in order to ensure their spreading, in total or in part, on a network such as Internet.

This allows making changes to the contents of the blocks of the pages of a document.

Through such an invention, it is possible to collect, from a document appearing in a storage means generated by a specific layout software program, all the data related to the container and the contents of the blocks forming the document, even the contents of these blocks themselves. These data are grouped at the level of said memory means and the necessary changes to be made to said blocks can be made, in a first step, only at the level of the data appearing in this memory means, this independently from the layout software and from the storage means 6.

In fact, when all the required changes have been made to the contents of the blocks, it is possible to generate a new storage means, on the one hand, compatible with the layout processing means (software) and, on the other hand, including all the changes and, still on the other hand, likely to adopt a form authorizing the printing out of the changed document.

The memory means defined by means of the method according to the invention also allows continuously managing the process of forming and changing the pages of a catalogue, this namely according to the degree of process of the procedure, the various intervening persons, . . . .

It is possible, from the data contained in the memory means, to group a number of particular data appearing in the blocks and at the level of the storage means. In particular, it is possible to collect data related to items, prices corresponding to the latter, appearing in a catalogue.

It is also possible, from these data, to create one or several new pages corresponding, for example, to one or several parts of a catalogue. This part can adopt the form of a tract or the like having the contents, eventually partial or updated contents, of one or several pages of a catalogue.

Such an embodiment also allows constituting and/or changing pages likely to be put on-line on an electronic data-transmission or data-processing network.

I claim:

1. A method of constituting a database relating to layout and data contained in a document to be printed, the database being made from a storage and generated by software processing, the storage being comprised of a file adapted for transmission to a printer so as to allow for the printing of the document, the storage containing data related to blocks belonging to an aggregate of blocks corresponding to the document, each of the blocks corresponding to a text or to an image of a page of the document, each of the blocks containing data relating to a container of the concerned text or image on the particular page and date related to content of the text or image, a determined arrangement of the blocks defining a composition of the page of the document, the storage storing in ordered blocks all data related to the container and all data related to the content of the considered texts and/or images of the document, each of the blocks being associated with an identifier so as to allow for identification within the storage, the method comprising the following steps:

collecting all blocks, block after block, at the storage;
   collecting for each of the blocks the data related to the container and to the content of the concerned text or image by collecting various types of unitary data corresponding to said data related to the container and to said data related to the content of each text and image of the document;
   creating a table and transferring into said table the unitary data for each block in connection with the corresponding identifier;

associating the identifier of each block and each unitary data corresponding to each type of data related to the container and to the content of each block with a location in the database by copying said table into said database;

detecting the blocks corresponding to a text;

collecting at the storage the content of a text block for each block corresponding to a text;

creating a text file for each of the text blocks into which the content of the concerned text block is transferred;

associating the identifier of each text block and each text file corresponding to the text block with a location in the database;

detecting data related to colors associated with images or texts in the blocks at the storage;

decomposing the data related to colors into a composition of primary color data;

transferring the composition of primary color data into a corresponding primary color table;

associating said primary color table with a location in the database, the database containing accessible and amendable data comprising the unitary data, the text content data and the image content data of each block, so as to be used for intervening on the blocks of the aggregate corresponding to the document and for either reconstituting the document or constituting a new document.

2. The method of claim 1, further comprising:
limiting access at least partially to the data related to the container and the content of each block and to the unitary data.

3. The method of claim 1, further comprising:
associating the identifier of each block corresponding to the text and the identifier of each text block with the text file in which contents of the text block appear.

4. The method of claim 1, further comprising:
generating the text file during the transfer into said table.

5. The method of claim 4, further comprising:
associating the alphanumeric character and the basic code with a location in the database.

6. The method of claim 5, further comprising:
defining an additional basic code corresponding to a series of the basic codes of said first part;
associating said additional basic code to a location in the database.

7. The method of claim 5, further comprising:
creating a complementary text file from the text file in which
the basic codes of said first part are replaced with the additional basic code; and
associating the complementary text file with a location in the database.

8. The method of claim 7, further comprising:
interpreting the basic code of said first part for each text file; and
associating the interpreted basic code and the alphanumeric characters of said second part with a location in the database.

9. The method of claim 8, further comprising:
forming a series of interpreted codes from the interpreted basic code;
defining an additional interpreted code corresponding to the series of interpreted codes; and
associating the additional interpreted code with a location in the database.

10. The method of claim 9, further comprising:
creating and additional text file from the text file in which the series of basic codes of said first part is replaced by the corresponding series of interpreted codes; and
associating said additional text file with a location in the database.

11. The method of claim 1, further comprising:
forming at least one block-type pattern defined by two parts, a first part of said two parts defined by a basic code, a second part of said two parts defined by an alphanumeric character, said step of forming being during said step of transferring, said alphanumeric character being associated with the basic code and corresponding to the text associated with said text block.

12. The method of claim 11, further comprising:
transferring the contents of the block corresponding to the text into a text file;
integrating at least one specific basic code defined by a series of basic codes into said text file, the specific basic code being associated with said first part.

13. The method of claim 12, further comprising:
associating the specific basic code with a location in the database.

14. The method of claim 12, further comprising:
interpreting the specific basic code into an specific interpreted code;
associating said specific interpreted code with a location in the database.

15. The method of claim 14, further comprising:
creating a further text file from the text file in which the specific basic code is replaced by the corresponding specific interpreted code;
associating the further text file with a location in the database.

16. The method of claim 15, further comprising:
limiting access to said first part and said second part as associated with the location in the database.

17. The method of claim 1, further comprising:
assigning a tag when creating the text file corresponding to the text block that is specific to the text file; and
associating the tag with a location in the database.

18. The method of claim 17, further comprising:
associating the tag with a piece of data related to the page in which the text block corresponding to the text file appears;
associating the piece of data with a location in the database.

19. The method of claim 18, further comprising:
creating a marked file for the page of the document;
transferring all of the tags corresponding to the text blocks of the page into said marked file; and
associating said marked file with a location in the database.

20. The method of claim 19, further comprising:
associating a secondary marked file with said marked file, said secondary marked file capable of being at least partially changed;
associating said secondary marked file with a location in the database.

21. The method of claim 20, further comprising:
limiting access to said tags and to contents of said marked file and said secondary marked file.

22. The method of claim 1, further comprising:
associating the identifier of each block corresponding to an image or data related to the container and contents of the block with contents of an image block.

23. The method of claim 1, further comprising:
associating the identifier with a location in the database.

24. The method of claim 1, further comprising:
limiting access to the composition or to the piece of data related to the given color.

* * * * *